May 16, 1950  J. S. ZINK  2,508,131
FLOOR FURNACE
Filed Dec. 30, 1947  2 Sheets-Sheet 1
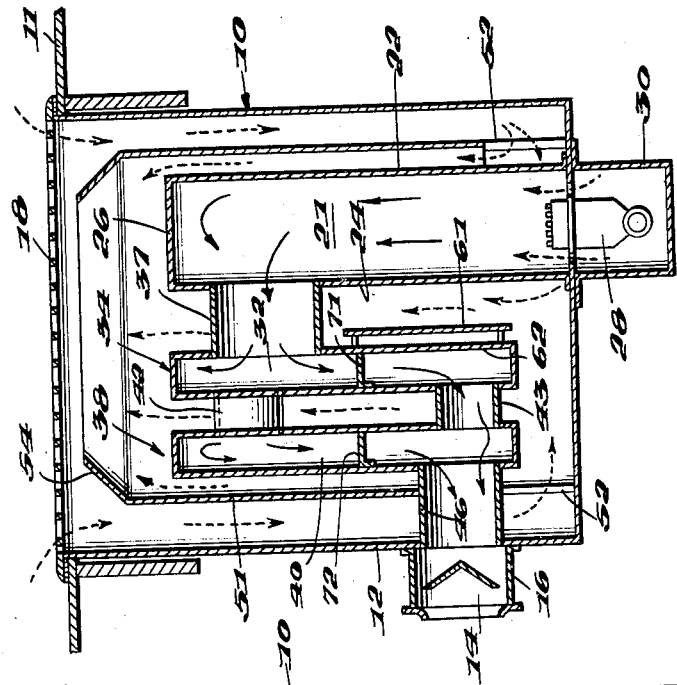
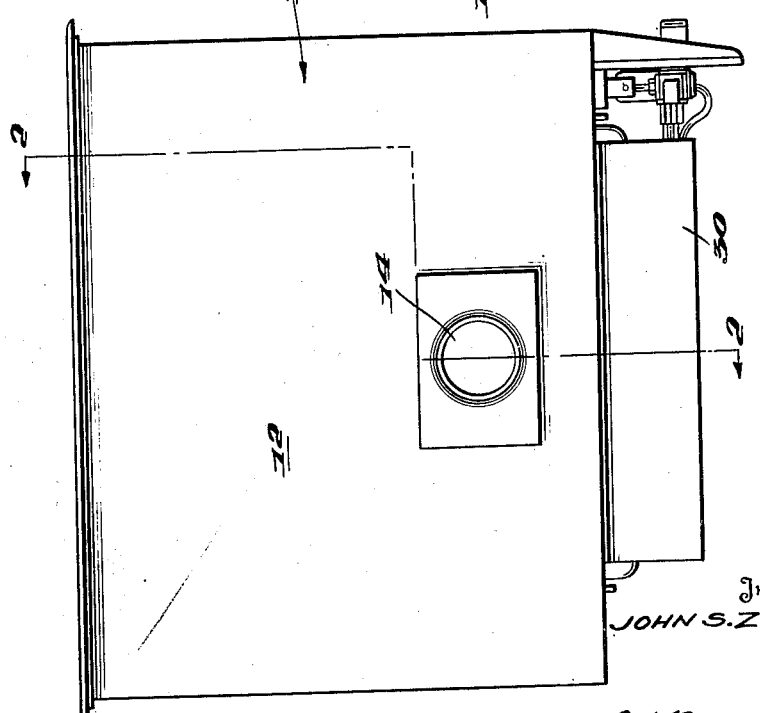
Inventor
JOHN S. ZINK,
By Robert E. Barry
Attorney May 16, 1950 J. S. ZINK 2,508,131
FLOOR FURNACE
Filed Dec. 30, 1947 2 Sheets-Sheet 2
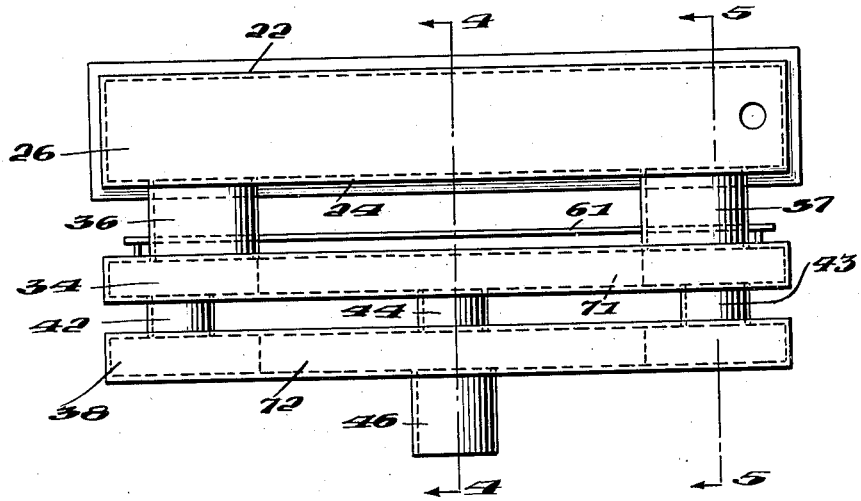
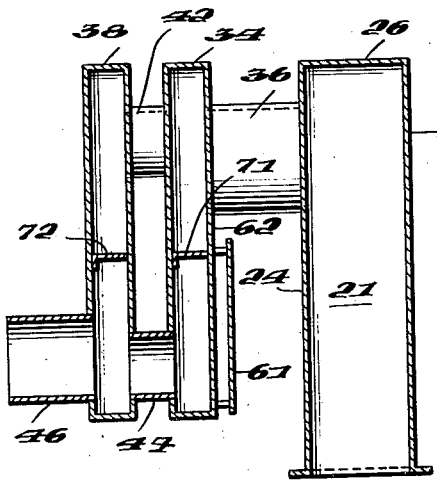 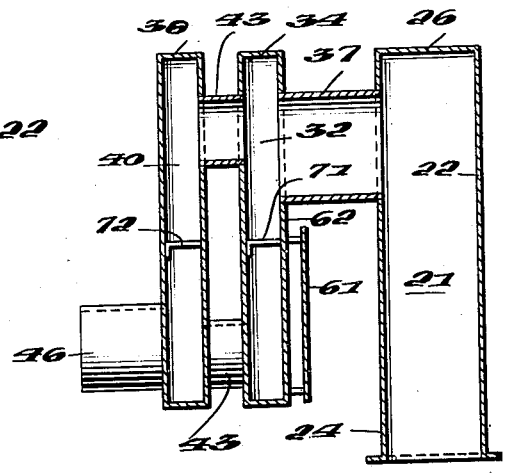
Inventor
JOHN S. ZINK,
By Robert E. Barry
Attorney Patented May 16, 1950

2,508,131

UNITED STATES PATENT OFFICE 2,508,131

FLOOR FURNACE

John S. Zink, Tulsa, Okla.

Application December 30, 1947, Serial No. 794,465

3 Claims. (Cl. 126—108)

The present invention relates to floor furnaces and more particularly pertains to heating apparatus of the warm air type for extracting additional heat from the flue gases produced by the burner.

One of the objects of the invention is to provide a plurality of convection sections or chambers in association with the combustion chamber of a floor furnace so as to obtain a maximum scrubbing effect for the removal of the heat from the flue gases.

A further object of the invention is to provide a plurality of convection sections or chambers adjacent the combustion chamber of a floor furnace through which the flue gases pass in parallel paths so as to provide a materially larger convection transfer area than that of prior furnaces.

A still further object of the invention is to provide means for proportioning the flow of the flue gases through a series of chambers so as to increase the heat radiating area of the floor furnace and thereby more efficiently extract the heat produced in the combustion chamber.

Another object of the invention includes means for preventing the transfer of radiant energy from the combustion chamber to the convection sections and to so arrange the convection sections that at least one of these chambers serves to isolate the other from the radiant heat produced by the combustion chamber.

Other objects and features of the invention will be more apparent as the present disclosure proceeds and upon consideration of the accompanying drawings and the following detailed description wherein a floor furnace embodying the invention is disclosed.

In the drawings:

Fig. 1 is an elevational view of a floor type furnace exhibiting the invention.

Fig. 2 is a sectional view of the furnace structure shown in Fig. 1, and taken in part on the line 2—2 of Fig. 1.

Fig. 3 is a plan view of the combustion chamber and the associated convection chambers.

Fig. 4 is a sectional view taken on the line 4—4 of Fig. 3.

Fig. 5 is a similar sectional view taken on the line 5—5 of Fig. 3.

The invention is directed to a floor furnace wherein fuel is burned in one chamber and the flue gases flow from this chamber along two parallel paths into a convection chamber or section. The first convection chamber is in open communication with a second convection section so that the flue gases move from the first convection section into the second and thereafter pass to the flue gas outlet. This furnace assembly provides a materially larger convection transfer area for removing substantially all of the heat from the flue gases and thereby prevents this energy from passing into the flue gas outlet as wasted energy. One convection chamber is interposed between the combustion chamber and a second convection chamber whereby the first convection section acts as a barrier to block the transfer of radiant heat from the combustion chamber. An additional feature of the invention pertains to the provision of a baffle between the combustion chamber and the first convection section to prevent the transfer of radiant energy from the combustion chamber to the first convection section.

Referring to the drawings, there is shown in Figs. 1 and 2, a furnace exhibiting the invention and adapted for use as a floor type heater. Such heating apparatus includes a housing 10 which is mounted below an opening in the floor indicated at 11. The housing 10 may be provided with flat sides so as to fit between the joists or other structural elements of the building. The housing 10 is closed as shown in Fig. 2 and includes a back wall 12. An outlet opening 14 is provided in the back wall for the flue gases. This outlet opening 14 may be extended by a tube 16 for connection to a chimney or other suitable flue for conveying the flue gases to the exterior of the building. The top of the housing 10 is covered by means of a grill 18 through which cold air may enter the housing 10 and through which warm air may pass to heat the building or the space which is to be heated. The grill 18 is preferably of such construction as to carry substantial loads and thereby permits individuals or other relatively heavy loads to pass over the furnace opening in the floor.

The furnace includes a combustion chamber 21 which may be of rectangular shape in cross section as will be apparent from a consideration of Fig. 3. The combustion chamber is defined by flat side walls 22 and 24 including a top wall 26 which may be formed of sheet metal. The sheet metal casing forming the combustion chamber 21 is mounted within the housing 10 as shown in Fig. 2 and a burner 28 of conventional construction is mounted on the lower portion of the combustion chamber. A supplemental housing 30 is arranged to partly enclose the burner 28 and the fuel supply line leading thereto. The burner may be controlled in any suitable manner. The housing 10 may also be encased in insulating material (not shown) if it is desired to reduce the rate of dissipation of heat from the exterior surface of the furnace.

A convection section or chamber 32 is arranged adjacent the combustion chamber 21. This section is formed of substantially flat side walls and provides an auxiliary housing 34 mounted along the side of the combustion chamber 21 and spaced therefrom as shown in Figs. 2 and 3. This convection section or chamber 32 is also of rectangular shape in cross section and is connected to the combustion chamber by means of two relatively large tubes 36 and 37. These tubes are arranged at the upper portion of the combustion chamber 21 and are also connected to the upper portion of the auxiliary housing 34.

A further feature of the invention pertains to another or second auxiliary housing 38 mounted alongside of the first convection section 32 and spaced therefrom as shown in Fig. 2. This auxiliary housing 38 provides a second convection chamber 40 which is rectangular shape in cross section. The auxiliary housing 38 is connected to the first auxiliary housing 34 by means of a plurality of pipes 42 and 43 which are of smaller cross sectional area than the tubes 36 and 37. The tubes 42 and 43 have a diameter substantially equal to one-half the diameter of the tubes 36 and 37. The pipes 42 and 43 connect the upper portions of the first convection section 32 with the upper portion of the second convection section 40. A conduit 44 is arranged to provide communication between the lower portion of the first auxiliary housing 34 and the lower portion of the second auxiliary housing 38. The conduit 44 is in alignment with a flue tube 46 which extends into the flue gas outlet opening 14. The flue tube 46 is preferably sealed with respect to the tube 16 and the housing wall 12.

The combustion chamber casing and the auxiliary housings 34 and 38 along with the tubes and pipes provides an assembly for conveying the flue gases from the combustion chamber through the convection chambers. This assembly may be mounted in an enclosing baffle 51 as shown in Fig. 2. This baffle is provided with an impervious side wall or walls open at the lower end to permit cold air to pass downwardly in the direction of the dotted arrows shown in Fig. 2 and into the presence of the combustion chamber and the convection sections. The lower end of the baffle 51 is supported above the bottom wall of the housing 10 and maintained in this position by means of brackets 52. The top portion of the baffle 51 may be open and of frusto-conical shape as shown at 54 for directing the heated air through the central portion of the grill 18.

Another feature of the invention pertains to the provision of a baffle plate 61 on the side wall 62 of the auxiliary housing 34. This baffle plate extends substantially throughout the length of the first convection chamber 32 and is provided for the purpose of isolating the first convection chamber from the radiant heat produced by the combustion chamber 21. An even more important feature of this arrangement is that the first auxiliary housing 34 is interposed between the convection section 40 and the combustion chamber 21 and blocks radiant transfer of heat from the combustion chamber to the second convection section. The baffle 51 may be mounted in any appropriate manner on the side wall 62.

The manner in which heat is dissipated from the furnace is indicated by means of arrows in Fig. 2 wherein the dotted line arrows indicate the circulating air and the full line arrows illustrate the movement of the flue gases. When the burner 20 is ignited, the flue gases rise upwardly in the combustion chamber 21 and some of these flue gases pass through the tube 36 and others pass through the tube 37. Two paths of escape for the flue gases are thus provided from the combustion chamber. These flue gases enter the auxiliary housing 34 where the walls thereof are heated and the gases move downwardly through this convection chamber 32. These flue gases escape through the pipes 42, 43 and 44. A baffle 71 is arranged in the convection chamber 32 and extends throughout the major portion of the length thereof as shown in Fig. 3. This baffle tends to further delay the flow of the flue gases through the convection section 32 to thereby permit additional heat to be extracted from the flue gases.

The flue gases escape from the auxiliary housing 34 through the pipes 42, 43 and 44 and pass into the auxiliary housing 38. The gases passing through the upper pipes 42 and 43 move downwardly in this second convection section and eventually escape through the pipe 46 and the outlet opening 14. A baffle 72 is provided in the auxiliary housing 38 which extends throughout a major portion of the length thereof as shown in Fig. 3 to further increase the tortuous passage of the flue gases, and thereby extract additional heat for dissipation by the walls of the convection section 40.

The heat dissipated by the combustion chamber and the convection sections is carried away by the air which moves in the direction of the dotted line arrows of Fig. 2. The cold air returning from the space being heated passes downwardly between the inner walls of the housing 10 and the exterior surface or surfaces of the baffle 51 and thereafter passes upwardly over the exterior surfaces of the combustion chamber 21 and the convection chambers 32 and 40. The pipes 36 and 37 and the tubes 42, 43 and 44 further provide surfaces for dissipating the heat extracted from the flue gases. The additional wall surfaces provided by the plurality of convection sections improves the dissipation of heat produced by the burner in that a greater amount of heat dissipating surface area is provided by the furnace assembly. The parallel flow of the flue gases further provides a larger convection transfer area than is possible with a combustion chamber or a heating arrangement having but one convection section.

While the invention has been described with reference to specific structural features, it will be apparent that changes may be made in the elements and in the organization of the convection sections with regard to the combustion chamber. Such changes and others may be made without departing from the spirit and scope of the invention as set forth in the appended claims.

What I claim and desire to secure by Letters Patent is:

1. In a floor furnace, a sheet metal casing having at least one flat side wall including a top wall and end walls providing a combustion chamber, a closed auxiliary housing providing a convection chamber including flat substantially parallel side walls arranged with one of the side walls adjacent the flat side wall of the combustion chamber, two tubes connecting top end portions of the combustion chamber with top end portions of the convection chamber, a second closed auxiliary housing providing a second convection chamber including flat substantially parallel side walls with one side wall thereof positioned adjacent and parallel to one flat side wall of the first auxiliary housing, two pipes each of smaller diameter than either of said tubes connecting top end portions of the second convection chamber with top end portions of the first convection chamber, a conduit of smaller diameter than either of said tubes connecting the lower mid-portion of the second convection chamber with the lower mid-portion of the first convection chamber, a baffle extending between the side walls of the first auxiliary housing below said tubes and extending horizontally a distance intermediate the horizontal spacing of said tubes, a baffle within the second auxiliary housing between the flat side walls thereof below said pipes and extending horizontally a distance intermediate the horizontal spacing of the pipes, and said second auxiliary housing having a flue outlet opening in the lower mid-portion thereof under the second baffle.

2. In a floor furnace, a sheet metal casing having substantially parallel side walls and end walls including a top wall providing a combustion chamber rectangular shaped in cross section, a closed auxiliary housing including flat substantially parallel side walls arranged adjacent and with one side wall parallel to a side wall of the combustion chamber and providing a convection chamber rectangular shaped in cross section, two tubes connecting top end portions of the combustion chamber with top end portions of the convection chamber, a second closed auxiliary housing including flat substantially parallel side walls arranged with one side wall thereof parallel to an adjacent side wall of the first auxiliary housing and providing a second convection chamber substantially rectangular shaped in cross section, two pipes each of smaller diameter than either of said tubes connecting top end portions of the second convection chamber with top end portions of the first convection chamber, a conduit of smaller diameter than either of said tubes connecting the lower mid-portion of the second convection chamber with a lower mid-portion of the first convection chamber, a horizontal plate between the side walls of the first auxiliary housing below said tubes and extending horizontally a distance intermediate the horizontal spacing of the tubes, a horizontal plate within the second auxiliary housing between the flat side walls thereof below said pipes and extending horizontally a distance less than the horizontal distance between the pipes, and said second auxiliary housing having a flue outlet opening in the lower mid-portion thereof under the second plate of larger diameter than either of said pipes or conduit.

3. In a floor furnace, a sheet metal casing having substantially parallel side walls and end walls including a top wall providing a combustion chamber rectangular shaped in cross section, a closed auxiliary housing including flat substantially parallel side walls arranged adjacent and with one side wall parallel to a side wall of the combustion chamber and providing a convection chamber rectangular shaped in cross section, two tubes connecting top end portions of the combustion chamber with top end portions of the convection chamber, a second closed auxiliary housing including flat substantially parallel side walls arranged with one side wall thereof and parallel to an adjacent side wall of the first auxiliary housing and providing a second convection chamber substantially rectangular shaped in cross section, two pipes each of smaller diameter than either of said tubes connecting top end portions of the second convection chamber with top end portions of the first convection chamber, a conduit of smaller diameter than either of said tubes connecting the lower mid-portion of the second convection chamber with a lower mid-portion of the first convection chamber, a horizontal plate between the side walls of the first auxiliary housing below said tubes and extending horizontally a distance intermediate the distance between the tubes, a horizontal plate within the second auxiliary housing between the flat side walls thereof arranged below the pipes and extending horizontally a distance intermediate the space between said pipes, said second auxiliary housing having a flue outlet opening in the lower mid-portion thereof under the second plate of larger diameter than either of said pipes or conduit, and a radiant heat baffle between the combustion chamber and the first convection chamber supported by the first auxiliary housing.

JOHN S. ZINK.

REFERENCES CITED

The following references are of record in the file of this patent:

UNITED STATES PATENTS

| Number | Name | Date |
|---|---|---|
| 8,104 | Pierce | May 20, 1851 |
| 1,991,704 | Schellhammer et al. | Feb. 19, 1935 |
| 2,200,645 | Stephens | May 14, 1940 |
| 2,387,939 | Olds | Oct. 30, 1945 |